United States Patent [19]

Bauermeister

[11] 4,368,583
[45] Jan. 18, 1983

[54] SOLAR-POWERED GRAIN DRYER AND PROCESS FOR DRYING GRAIN

[76] Inventor: Fred H. Bauermeister, 2801 Holiday La., St. Charles, Mo. 63301

[21] Appl. No.: 196,271

[22] Filed: Oct. 14, 1980

[51] Int. Cl.³ .............................................. F26B 3/28
[52] U.S. Cl. ..................................... 34/93; 126/449; 126/901
[58] Field of Search .......................... 34/93, 225, 233; 126/449, 450, 444, 445, 901

[56] References Cited

U.S. PATENT DOCUMENTS

| | | | |
|---|---|---|---|
| 3,943,911 | 3/1976 | Yu | 126/450 |
| 3,995,804 | 12/1976 | Folds et al. | 126/450 |
| 4,016,861 | 4/1977 | Taylor | 126/400 |
| 4,198,956 | 4/1980 | Soleau, Jr. | 126/444 |
| 4,243,022 | 1/1981 | Pedone | 126/901 |
| 4,257,169 | 3/1981 | Pierce | 34/225 |
| 4,266,531 | 5/1981 | Behrendt et al. | 126/449 |

OTHER PUBLICATIONS

Farm Journal, Aug. 1980, pp. 11–15, "Dries Corn for 2½¢ a Bushel", Harness More Energy from the Sun.

*Primary Examiner*—Larry I. Schwartz
*Attorney, Agent, or Firm*—Gordon W. Hueschen

[57] ABSTRACT

A portable solar heating panel adapted for use in drying grain in the season thereof and for use for heating buildings or like heating purposes in the off season, is made of a double-glazed window spaced from an imperforate accumulator plate providing a dead air space which, in turn, is spaced from an insulating wall providing a circulating air space, characterized by the fact that all of the air to be heated is in heat-exchange with the rear surface only of the accumulator plate and by the fact that circulating air never comes into contact with the rear surface of the window. The accumulator plate is 5 millimeters or less in thickness, and is made of an aluminum alloy which, at that thickness, provides an isothermic plate which promotes uniform heat transfer and which has a coefficient of expansion which results in distortion of the surface plane of the plate to provide increased surface exposure, particularly during the early hours of the collection day, when the sun's rays are at less than a 90 degree angle.

39 Claims, 5 Drawing Figures

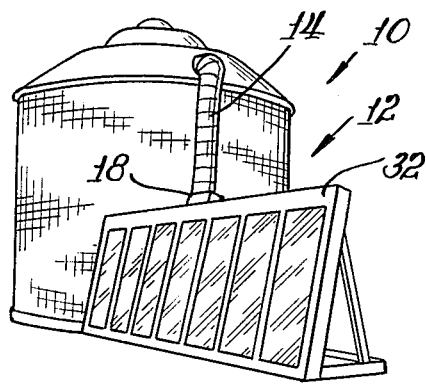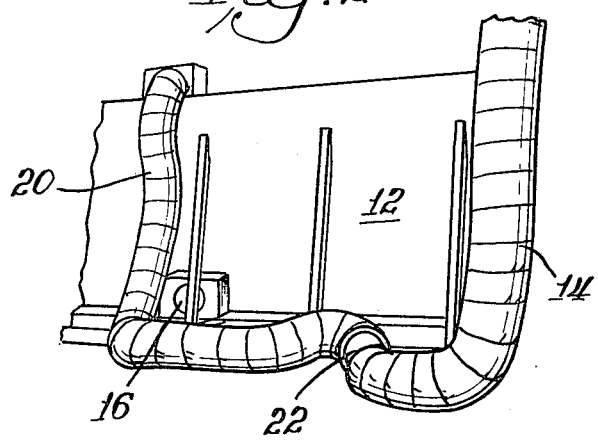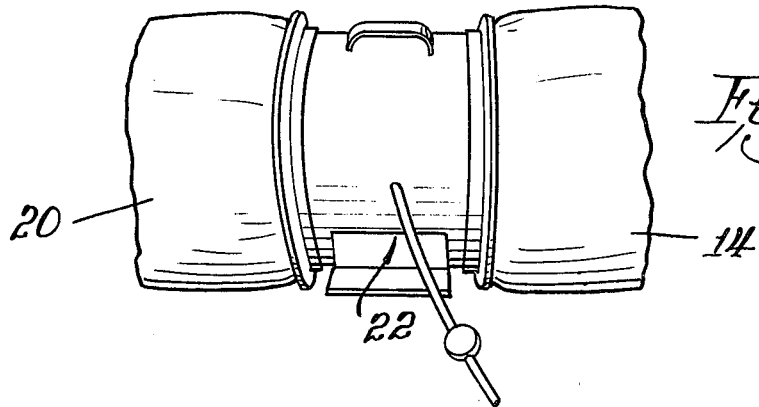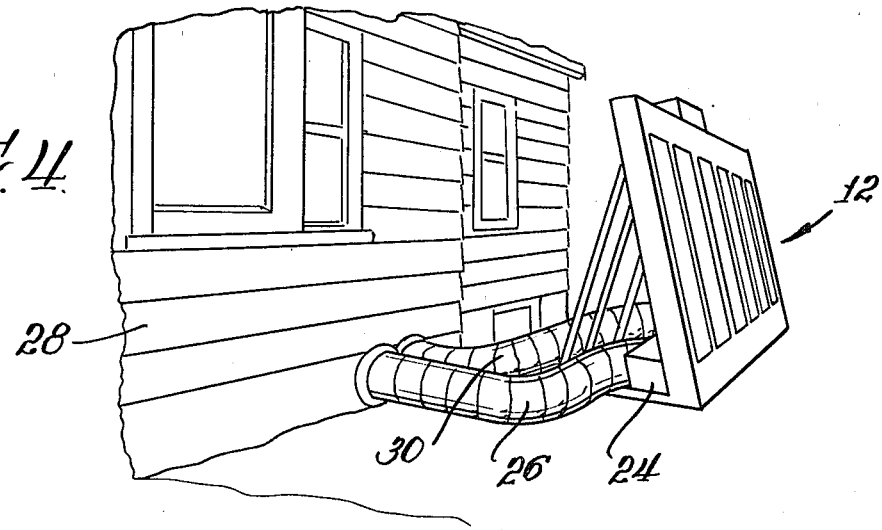

4,368,583

SOLAR-POWERED GRAIN DRYER AND PROCESS FOR DRYING GRAIN

FIELD OF INVENTION AND PRIOR ART

The invention relates to a solar-powered grain dryer and process for drying grain and is particularly directed to an improved solar heating panel.

Solar heating panels are well known in the art. See, for example, U.S. Pat. No. 3,863,621 and the patents cited therein. Such solar heating panels, however, have not been suited for drying grain because of the gross exposure to dust-laden air associated with such operations and because the limited period of usefulness hardly justified the cost of the solar panels.

OBJECTS OF THE INVENTION

It is an object of the invention to provide a new and improved grain dryer and process for drying grain. It is a further object of the invention to provide a novel solar heating panel particularly suitable for use in a solar heating unit for drying grain. It is a further object of the invention to provide a solar heating panel which is insensitive to dust-laden or corrosive air. It is a further object of the invention to provide a portable solar heating unit which is interchangeable between drying grain and heating buildings, such as farm houses, barns, and the like. It is a further object of the invention to provide a solar heating panel having an improved accumulator or absorber. It is a further object of the invention to avoid the disadvantages of the prior art and to obtain such advantages as will appear as the description proceeds.

BRIEF DESCRIPTION OF THE INVENTION

The invention relates to a grain dryer and to a process for drying grain in which pre-heated ambient air is passed in contact with a mass of grain and in which the air is pre-heated, at least in part, by passage through a solar heating unit which comprises an accumulator or absorber, a transparent panel for passing radiant solar energy onto the accumulator panel and channeling means for channeling the ambient air into contact with the reverse side of the accumulator and keeping it out of contact with the inner surface of the transparent panel.

In its broader aspects, the invention comprises a novel solar panel which comprises a transparent pane separated from the accumulator by a dead air space, in which there is no flow of air other than that induced by convection. In particular, the invention is directed to such solar heating panels in which the transparent panel is a multiplane panel with a vacuum between adjacent panes for reducing heat loss from the dead air space through convection.

In the preferred form of the invention, the solar heating unit is portable so that it can be moved from the grain drying operation and hooked up to a building for heating the same during the season when it is not needed for drying grain and, to this end, is provided with means for channeling ambient air into the solar heating unit when it is used for drying grain and means for circulating air to and from said building when it is used for heating a building.

In its further aspects, the invention is related to a solar heating panel *per se,* which is particularly adapted for use where dust-laden or corrosive air is passed in contact with the reverse side only of the accumulator and kept out of contact with the reverse side of the transparent pane.

Advantageously, the accumulator plate is isothermic, so that uniform heat transfer from the obverse side to the reverse side is obtained. This is an important feature of the invention because the heat-transfer gas is heated exclusively by the reverse side of the accumulator plate. Preferably, the plate is made of a thin sheet of foil, say not more than 5 millimeters thick, made of aluminum alloy or any other suitable metal which can be processed into a foil of the desired thickness. An aluminum alloy which gives a foil having optimum isothermic properties and optimum tensile strength is one containing at least 99.45 percent aluminum; not more than 0.55 percent silicon, 0.55 percent iron, and 0.05 percent manganese; not less than 0.05 percent copper; and not more than 0.03 percent other elements.

An accumulator made of metallic foil of this thickness particularly when made of the particular alloy given above, has the further advantage that the coefficient of expansion is such that a distortion or crinkling of the foil takes place during the operation due to the differential temperature induced between the obverse and reverse surfaces thereof, which provides increased surface exposure and better collecting properties when the incident angle of the solar radiation is other than 90 degrees.

Alternatively, a pre-crimped foil can be used with like advantage. In either case, the crinkling or crimping has the effect of promoting heat-transfer from the obverse face of the accumulator and to the air brought into contact therewith.

The invention contemplates a marketable unit which comprises the transparent window and the accumulator supported in a suitable frame which can be built into any existing structure or any new structure, so as to provide a circulating air space between a wall of the building and the accumulator. Such a solar panel has the same advantage in keeping the reverse or inner surface of the window free of accumulation of dust or free from attack from corrosive chemicals.

Advantageously, this sheet of aluminum alloy is surrounded by a rigid frame and is unitary therewith. The coefficient of expansion inherent in the alloy results in a distortion or crinkling of the foil, which provides increased surface exposure, which is particularly advantageous when the rays of radiant energy impinge on the sheet at more or less than a 90 degree angle.

In its use for drying grain, it is of advantage to have the inlet to the channeling means open to the ambient atmosphere; and, in its use for heating a building, to have the inlet of the channeling means in a closed cycle with the outlet thereof. Advantageously, means is provided whereby the channeling means is convertible from being open to the ambient atmosphere to a closed cycle in which the heated heat-transfer gas, after it has served its heating purpose, is recycled to the inlet of the channeling means.

The channeling means is provided with baffles, as desired, to effect turbulence therein. Also, the dead air space can be provided with transparent baffles to isolate and minimize convection currents.

The solar panel *per se* is a marketable unit which can be built into permanent buildings, in which case, a wall of the building can provide the insulated wall which is opposed to the accumulator to provide the circulating air space. When the solar heating panel *per se* is built into a livestock confinement building, especially one confining hogs, and the solar heating unit is used in connection therewith, it has the further advantage that the corrosive atmosphere which contains ammonia and sulfur which results from the excrement of the animals, does not come in contact with and corrode the reverse side of the transparent panel, but only in contact with the reverse side of the absorber. When this is composed of the aluminum alloy above-described, it has the further advantage of providing high corrosion resistance to these particular corrosive elements.

BRIEF DESCRIPTION OF THE DRAWINGS

In the drawings:

FIG. 1 is a front elevation view of the solar heating unit of the invention applied to a grain storage bin;

FIG. 2 is a rear elevation view of the heating unit of FIG. 1;

FIG. 3 is a detailed view of an in-line blower of FIG. 2;

FIG. 4 is a view showing the heating unit of the invention applied to a building; and, FIG. 5 is a cross-sectional view of the solar heating unit the invention.

DETAILED DESCRIPTION OF THE INVENTION

Figure 5:
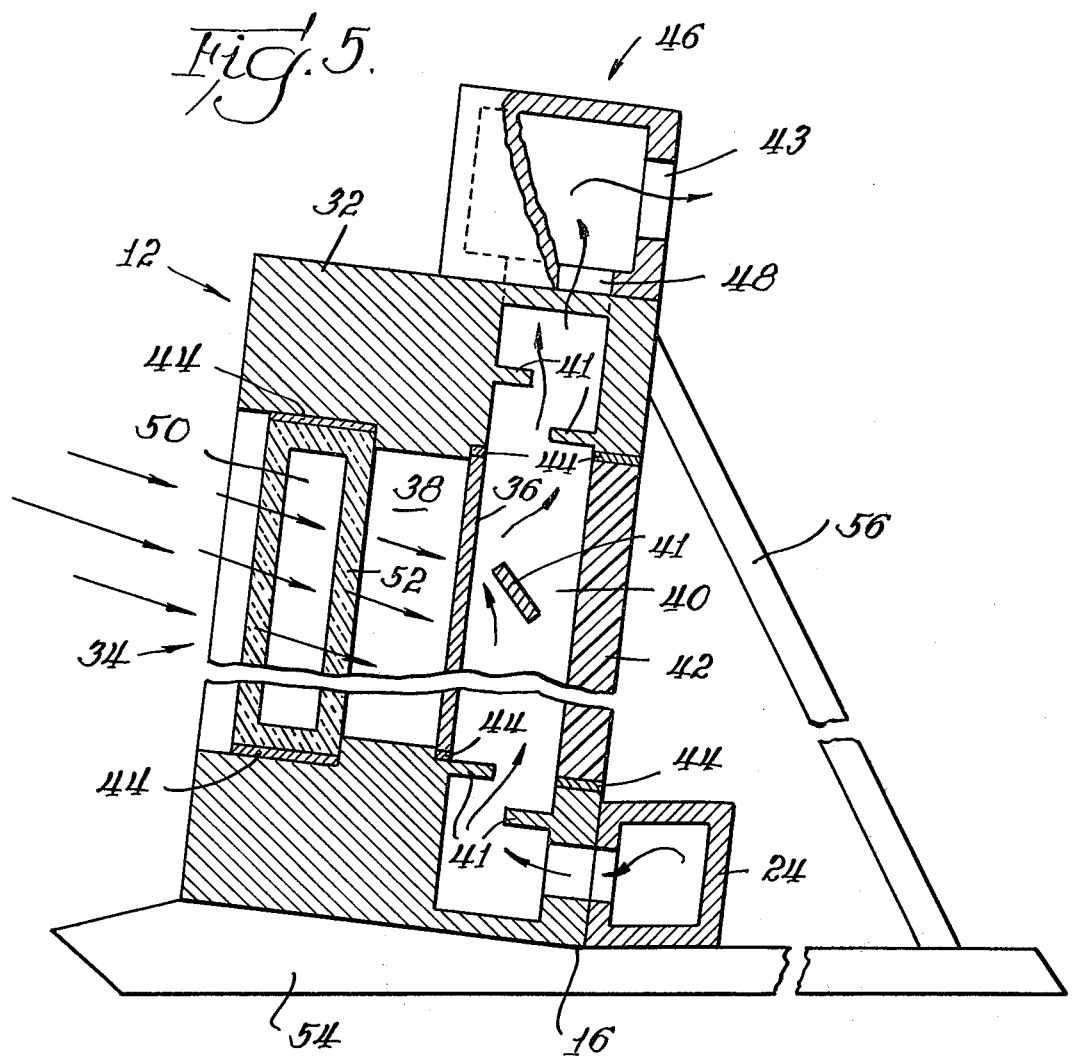

In FIG. 1 there is shown a grain bin 10 having a solar heating unit 12 hooked up thereto with the outlet pipe 14 of the solar unit 12 entering in the top of the bin 10.

As shown in FIG. 2, ambient air enters the solar unit 12 through one or more apertures 16 at the bottom thereof and exits through an outlet dome 18 at the top of the unit which connects with conduit 20, which is connected to the conduit 14 through an in-line blower 22.

In FIG. 4, the inlet apertures 16 communicate with a manifold 24 which, in turn, communicates with an inlet conduit 26, which exits from the building 28. The return air is thus fed through conduit 26 of the manifold 24 up through the solar unit 12, out through the top and down through conduit 30 into the building. The air can pass directly into and out of the building or, through a heat-exchanger or air handler, not shown, for example, the cold air return of a hot air furnace. A closed circuit is thus formed.

The solar unit 12 is mounted on skids, as seen in FIG. 5, so that it can readily be moved from one location to another. Thus, in the fall, when the solar unit is not needed to heat a building, but is needed for drying grain, it is hooked up as shown in FIG. 1. Later in the season, when the solar unit is no longer needed for drying grain, it is hooked up as shown in FIG. 4, where it can be used to supplement the heat in a home, as shown, or provide heat to some outbuilding on the farm. Thus, the seasonal down-time of the solar unit is minimized, so that the investment therein can be more easily justified.

In FIG. 5, there is shown a solar unit according to the invention, in which 32 is a framework having sealed in the forepart thereof, a multipane panel with a vacuum between adjacent or opposed panes, for example a double-glazed, low-iron, insulated, tempered glass panel 34, which admits radiant solar energy and yet insulates against the passage of other forms of heat. Faced inwardly from the window 34 is an accumulator or absorber 36 structured of suitable material to absorb the radiant energy passing through the glazing 34. The accumulator 36 is spaced from the window 34 to provide a closed and sealed dead air space 38, the purpose of which will be presently described. At the rear of the accumulator 36 is a circulating air space 40, which is baffled (as shown at 41) to cause turbulence, which eliminates layering in the circulating air space, and communicates with inlet 16 and outlet 43. To the rear of the circulating air space 40 is an insulated wall panel 42. The window 34, the accumulator 36, and the insulating panel 42 are sealed in the frame 32 by suitable sealing material 44. To the bottom rear is the manifold 24 which communicates with the inlet apertures which constitutes the only access of ambient or circulated air into the unit 16.

At the top of the frame 32 is an outlet chamber 46 having the outlet 43 therein and apertures 48 at the bottom thereof communicating with a corresponding aperture in the frame 32, which communicates with the circulating air space 40. If desired, the outlet chamber 46 can be a manifold communicating with a plurality of outlet apertures 48 in order to distribute the flow of air to the circulating air space 40. The baffles 41, which in some applications can be omitted, effect distribution of the air in the circulating air space and create turbulence therein to promote heat transfer from the accumulator plate 36 into the circulating air. This turbulence also minimizes the accumulation of dust on the reverse side of the accumulator panel 36.

The space 50 in the double-glazed window is evacuated in accordance with the practice already known in the art, but the space 38 between the window 34 and the accumulator 36 is not.

One purpose of the dead air space 38 is to protect the inner face 52 from exposure to dust-laden or corrosive ambient air which is encountered around a farm, and provides near zero velocity at the glazing surface, thus reducing the loss via convection. For this purpose, the accumulator 36 is a solid, imperforate sheet, so that no transfer of air from the circulating air space 40 to the dead air space 38 is possible. If desired, a molecular sieve desiccant can be included in the dead air space 38 to eliminate any possibility of fogging. Also, if desired, transparent baffles, not shown, can be included therein to minimize convection currents. The solar unit 12 is mounted on skids 54 at an angle to the vertical so that it will be at a proper angle to receive the sun's rays. Suitable braces or struts 56 can be provided to hold the panel at the desired angle.

In the operation of the solar unit, in connection with a corn crib, grain bin, or flat storage, or the like, as shown in FIGS. 1 and 2, the manifold 24 can be taken off in order to provide free and unrestricted flow of ambient air to the circulating air space 40. Any suitable blower, such as the in-line blower 22 can be used to effect this circulation. Thus, no matter how dust-laden the ambient air is, none of it contacts the inner or reverse surface 52 of the window 34. This is an important feature of the invention, since it makes possible the use of the solar unit efficiently in an environment where dust-laden air is encountered, without the necessity of filtering the air or providing removable windows so that they can be removed for cleaning purposes.

In the application shown in FIG. 4, the air flow is in a closed cycle comprising the building, the manifold 24, the outlet header 46, and connecting pipes 26 and 30.

The same advantage is obtained in case the solar panel is incorporated in a livestock confinement building, as the corrosive air is kept out of contact with the reverse surface 52 of the window 34 and confined to contact with the interior surfaces only of the circulating air space 40.

If desired, the conduit 20 can be connected to the inlet side of the solar unit, in which case, the blower 22 is reversed, thus making it possible to have either a negative or positive air flow through the solar unit.

The size of the in-line blower 22 is chosen to provide an air velocity suitable for drying grain, it being taken into account that excessively high temperatures can cause degredation of the grain. For practical purposes, it has been found that a blower which effects a circulation of between about twenty-five to about thirty cubic feet per minute per square foot of collector exposed thereto, will produce a temperature which is not excessive. If desired, the in-line blower 22 can be made variable, so that the flow can be adjusted to the particular kind of grain being dried, and to the particular conditions obtaining at the time.

In the application of the invention to heating buildings, a considerably lower flow rate through the solar unit is desirable in order to produce a higher temperature effluent.

Thus, the invention provides a simple and effective solar unit which, during the harvest season, can be utilized to dry grain and has the advantage for this purpose that the grain is not exposed to temperatures so high as to alter its food value or its keeping qualities. Also, unlike the grain driers heretofore in use, which have only seasonal usefulness, the solar unit of the invention has multi-seasonal uses, so that the initial cost and upkeep is not borne solely by the grain operation.

The effectiveness of the solar unit of the invention is greatly increased by making the accumulator 36 of isothermic material, that is to say, of a material having uniform heat-transfer characteristics throughout its expanse. This desideratum is accomplished most effectively by using a thin sheet of foil, say about 5 millimeters in thickness, or less, made of an aluminum alloy or any other suitable metal which can be processed into a foil of the desired thickness. An aluminum alloy which gives a foil having optimum isothermic properties and optimum tensile strength is one containing 99.45 percent aluminum, not less than 0.05 percent copper, not more than 0.55 percent silicon and iron, not more than 0.05 percent manganese, and not more than 0.03 percent unspecified elements.

An accumulator made of metallic foil of this thickness, particularly when made of the particular alloy given above, has the further advantage that the coefficient of expansion is such that a distortion or crinkling of the foil takes place during the operation due to the differential temperature induced between the obverse and reverse surfaces thereof, which provides increased surface exposure and better collecting properties when the incident angle of the solar radiation is other than 90 degrees.

Alternatively, a pre-crimped foil can be used with like advantage. In either case, the crinkling or crimping has the effect of promoting heat-transfer from the obverse face of the accumulator and to the air brought in contact therewith.

The invention contemplates a marketable unit which comprises the transparent window 34 and the accumulator 36 supported in a suitable frame which can be built into any existing structure or any new structure, so as to provide a circulating air space between a wall of the structure and the accumulator 36. Such a solar panel has the same advantages in keeping the reverse or inner surface 52 of the window 34 free of accumulation of dust or free from attack from corrosive chemicals.

It is to be understood that the invention is not to be limited to the exact details of operation or structure shown and described, as obvious modifications and equivalents will be apparent to one skilled in the art.

I claim:

1. In a grain dryer which comprises means for passing heated ambient air through a mass of said grain and a heating unit for imparting heat to said air before it is brought into contact with said grain, the improvement in said heating unit which comprises:
   an imperforate accumulator panel of heat-conducting metal;
   a transparent panel for passing radiant solar energy onto said accumulator panel;
   channeling means for channeling said ambient air into contact with the reverse side of said accumulator; and,
   keepng means for keeping dust particles carried by the ambient air from being deposited on the inner surfaces of said panels; said transparent panel being uncovered, so that its outer surface can be easily cleaned of any dust particles deposited thereon, said accumulator panel being composed of a single sheet of isothermic foil having uniform heat-transfer characteristics throughout its expanse and being crinkled or subject to crinkling due to the differential expansion of the surfaces thereof.

2. A grain dryer of claim 1, in which said transparent panel is separated from said accumulator panel by a closed and sealed dead air space and in which said transparent panel is a multipane panel with a vacuum between adjacent panes for preventing heat loss from said dead air space through convection, said dead air space and the vacuum between the panes of said multipane panel constituting, at least in part, said keeping means.

3. A grain dryer according to claim 1, in which said solar heating unit is portable so that it can be moved from the grain drying operation and hooked up to a building for heating the same during the season when it is not needed for drying grain and is provided with means for channeling ambient air into the solar heating unit when it is used for drying grain and means for circulating air to and from said building when it is used for heating a building.

4. A grain dryer of claim 1, in which said foil is complementarily crinkled on both sides.

5. The grain dryer according to claim 4, in which said channeling means comprises baffle means creating turbulence in the air flow, thereby promoting contact with said accumulator panel and minimizing deposition of dust thereon.

6. A grain dryer of claim 1, in which said foil becomes complementarily crinkled on both sides in the operation of the dryer.

7. A process for drying grain which comprises:
   passing pre-heated ambient air in contact with a mass of said grain and preheating said air, at least in part, by passage through a solar heating unit which comprises an imperforate accumulator panel and a transparent panel for passing radiant solar energy onto said accumulator panel;
   channeling ambient air through said solar heating unit in contact with the reverse side of said accumulator panel; keeping dust particles carried by ambient air from being deposited on the inner surfaces of said panels; and keeping said transparent panel exposed to ramdon ambient air, uncovered so that it can be easily cleaned, and free of internal convection currents between the surface thereof exposed to said random ambient air and the surface thereof opposed to said accumulator panel, said accumulator panel being composed of a single sheet of isothermic foil having uniform heat-transfer characteristics throughout its expanse and being crinkled or subject to crinkling due to the differential expansion of the surfaces thereof.

8. A process of claim 7, in which said foil is complementarily crinkled on both sides.

9. A process according to claim 8, which further comprises creating turbulence in the air passing in contact with the reverse side of said accumulator panel into said air and minimizing deposition of dust on said accumulator.

10. A process according to claim 7, in which ambient air is passed in contact with the reverse surface of said accumulator at a rate of between 25 and 30 cubic feet per minute per square foot of said reverse surface exposed thereto.

11. A process of claim 7, in which said foil becomes complementarily crinkled on both sides in the operation of the unit.

12. A solar heating unit comprising:
an imperforate accumulator panel of heat-conducting metal composed of a single sheet of isothermic foil having uniform heat-transfer characteristics throughout its expanse and being crinkled or subject to crinkling due to differential expansion of the surfaces thereof;
a transparent panel for passing radiant solar energy onto said accumulator panel;
channeling means for channeling said heat-transfer gas into said solar heating unit into contact with the reverse side of said accumulator panel; and
keeping means for keeping dust particles carried by the ambient air from being deposited on the inner surfaces of said panels, said transparent panel being uncovered, so that its outer surface can be easily cleaned of any dust particles deposited thereon.

13. A solar heating unit of claim 12, in which said transparent panel is separated from said accumulator panel by a closed and sealed dead air space and in which said transparent panel is a multipane panel with a vacuum between adjacent panes for preventing heat loss from said dead air space through convection, said dead air space and the vacuum between the panes of said multipane panel constituting, at least in part, said keeping means.

14. A solar heating unit of claim 12, in which said foil is complementarily crinkled on both sides.

15. The solar unit according to claim 14, in which said channeling means comprises baffle means creating turbulence in the air flow, thereby promoting contact with said accumulator panel and minimizing deposition of dust thereon.

16. A solar heating unit of claim 12, in which said foil becomes complementarily crinkled on both sides in the operation of the unit.

17. A solar heating unit comprising an imperforate accumulator panel of heat-conducting metal composed of a single sheet of isothermic foil having uniform heat-transfer characteristics throughout its expanse, and being crinkled or subject to crinkling due to differential expansion of the surfaces thereof, and a transparent panel for passing radiant solar energy onto said accumulator panel, characterized in that said panels are separated by means forming a closed and sealed dead air space between them, in that said transparent panel is exposed to random ambient air, is uncovered so that it can be easily cleaned, and is free of internal convection currents between the surface thereof exposed to said random ambient air and the surface thereof opposed to said accumulator panel.

18. A solar heating panel comprising an imperforate accumulator panel of heat-conducting metal and a transparent panel for passing radiant solar energy onto said accumulator panel, characterized in that said panels are separated by means forming a dead air space between them; in which said accumulator panel is isothermic; and, in which said accumulator panel is composed of a flat sheet of metallic foil such that the temperature differential between its obverse and reverse surfaces induced by its operation causes a crinkling of said foil.

19. A solar panel according to claim 18, in which said foil is composed of an aluminum alloy and is not more than about 5 millimeters thick.

20. A solar panel according to claim 19, in which said aluminum alloy contains at least 99.45 percent aluminum; not more than 0.55 percent silicon, 0.55 percent iron, and 0.05 percent manganese; not less than 0.05 percent copper; and not more than 0.03 percent other elements.

21. A solar heating unit comprising::
an imperforate accumulator panel of heat-conducting metal;
a transparent panel for passing radiant solar energy onto said accumulator panel; and, channeling means for channeling a heat-transfer gas into said solar heating unit into contact with the reverse side of said accumulator panel and keeping it out of contact with the inner surface of said transparent panel, whereby dust-laden or corrosive air can be passed through said solar heating unit without coming into contact with the inner surface of said transparent panel; in which said transparent panel is separated from said accumulator panel by a dead air and in which said transparent panel is a multiplane panel with a vacuum between adjacent panes for preventing heat loss from said dead air space through convection; in which said accumulator panel is isothermic; and, in which said accumulator is composed of a flat sheet of metallic foil such that the temperature differential between its obverse and reverse surfaces induced by its operation causes a crinkling of said foil.

22. A solar heating unit according to claim 21, in which said foil is composed of an aluminum alloy and is not more than about 5 millimeters thick.

23. A solar heating unit according to claim 22, in which said isothermic panel is a flat sheet of foil composed of an aluminum alloy containing at least 99.45 percent aluminum; not more than 0.55 percent silicon, 0.55 percent iron, and 0.05 percent manganese; not less than 0.05 percent copper; and not more than 0.03 percent other elements.

24. A solar heating unit according to claim 23, in which said foil is surrounded by a rigid frame and is unitary therewith, whereby the coefficient of expansion inherent in said alloy results in a distortion or crinkling of said foil which provides increased surface exposure when the rays of radiant energy impinge on said panel at an acute angle.

25. A grain dryer which comprises means for passing heated ambient air through a mass of said grain and solar unit for imparting heat to said air before it is brought into contact with said grain, the improvement in said solar heating unit which comprises:
- an imperforate accumulator panel of heat-conducting metal;
- a transparent panel for passing radiant solar energy onto said accumulator panel; and,
- channeling means for channeling said ambient air into contact with the reverse side of said accumulator and keeping it out of contact with the inner surface of said transparent panel; in which said accumulator panel is isothermic; and, in which said accumulator is composed of a flat sheet of metallic foil such that the temperature differential between its obverse and reverse surfaces induced by its operation causes a crinkling of said foil.

26. A grain dryer according to claim 25, in which said foil is composed of an aluminum alloy and is not more than about 5 millimeters thick.

27. A grain dryer according to claim 26, in which said isothermic panel is a flat sheet of foil composed of an aluminum alloy containing at least 99.45 percent aluminum; not more than 0.55 percent silicon, 0.55 percent iron, and 0.05 percent manganese; not less than 0.05 percent copper; and not more than 0.03 percent other elements.

28. A grain dryer according to claim 27, in which said foil is surrounded by a rigid frame and is unitary therewith, whereby the coefficient of expansion inherent in said alloy results in a distortion or crinkling of said foil which provides increased surface exposure when the rays of radiant energy impinge on said panel at an acute angle.

29. A process for drying grain in which pre-heated ambient air is passed in contact with a mass of said grain and in which said air is pre-heated, at least in part, by passage through a solar heating unit which comprises an accumulator panel and a transparent panel for passing radiant solar energy onto said accumulator panel, the improvement which comprises passing ambient air through said solar heating unit in contact with the reverse side of said accumulator panel and out of contact with the inner surface of said transparent panel, whereby dust particles carried by said ambient air are kept from being deposited on the inner surface of said transparent panel, in which said accumulator panel is isothermic; and, in which said accumulator is composed of a flat sheet of metallic foil such that the temperature differential between its obverse and reverse surfaces induced by its operation causes a crinkling of said foil.

30. A process according to claim 29, in which said foil is composed of an aluminum alloy and is not more than about 5 millimeters thick.

31. A process according to claim 30, in which said foil is composed of an aluminum alloy containing at least 99.45 percent aluminum; not more than 0.55 percent silicon, 0.55 percent iron, and 0.05 percent manganese; not less than 0.05 percent copper; and not more than 0.03 percent other elements.

32. A process according to claim 31, in which said foil is surrounded by a rigid frame and is unitary therewith, whereby the coefficient of expansion inherent in said alloy results in a distortion or crinkling of said foil which provides increased surface exposure when the rays of radiant energy impinge on said panel at an acute angle.

33. A process for dyring grain in which pre-heated ambient air is passed in contact with a mass of said grain and in which said air is pre-heated, at least in part, by passage through a solar heating unit which comprises an accumulator panel and a transparent panel for passing radiant solar energy onto said accumulator panel, the improvement which comprises passing ambient air through said solar heating unit in contact with the reverse side of said accumulator panel and out of contact with the inner surface of said transparent panel, whereby dust particles carried by said ambient air are kept from being deposited on the inner surface of said transparent panel; in which ambient air is passed in contact with the reverse surface of said accumulator at a rate of between 25 and 30 cubic feet per minute per square foot of said reverse surface exposed thereto; in which said accumulator panel is isothermic; and, in which said accumulator is composed of a flat sheet of metallic foil such that the temperature differential between its obverse and reverse surfaces induced by its operation causes a crinkling of said foil.

34. A process according to claim 33, in which said foil is composed of an aluminum alloy and is not more than about 5 millimeters thick.

35. A process according to claim 34, in which said aluminum alloy contains at least 99.45 percent aluminum, not more than 0.55 percent silicon, 0.55 percent iron, and 0.05 percent manganese; not less than 0.05 percent copper; and not more than 0.03 other elements.

36. In a grain dryer which comprises means for passing heated ambient air through a mass of said grain and a heating unit for imparting heat to said air before it is brought into contact with said grain, the improvement in said heating unit which comprises:
- an imperforate accumulator panel of heat-conducting metal;
- a transparent panel for passing radiant solar energy onto said accumulator panel;
- channeling means for channeling said ambient air into contact with the reverse side of said accumulator; and,
- keeping means for keeping dust particles carried by the ambient air from being deposited on the inner surfaces of said panels; said transparent panel being uncovered, so that its outer surface can be easily cleaned of any dust particles deposited thereon, in which said accumulator panel is composed of a single sheet of isothermic foil having uniform heat-transfer characteristics throughout its expanse, and in which said foil is composed of an aluminum alloy containing at least 99.45 percent aluminum; not more than 0.55 percent silicon, 0.55 percent iron, and 0.05 percent manganese; not less than 0.05 percent copper; and not more than 0.03 percent other elements.

37. A solar heating unit of claim 36, in which said foil is surrounded by a rigid frame and is unitary therewith, whereby the coefficient of expansion inherent in said alloy results in a distortion or crinkling of said foil which provides increased surface exposure when the rays of radiant energy impinge on said panel at an acute angle.

38. A solr heating unit comprising:
- an imperforate accumulator panel of heat-conducting metal composed of a single sheet of isothermic foil having uniform heat-transfer characteristic throughout its expanse and being crinkled or subject to crinkling due to differential expansion of the surfaces thereof;

a transparent panel for passing radiant solar energy onto said accumulator panel;

channeling means for channeling said heat-transfer gas into said solar heating unit into contact with the reverse side of said accumulator panel; and, keeping means for keeping dust particles carried by the ambient air from being deposited on the inner surfaces of said panels, said transparent panel being uncovered, so that its outer surface can be easily cleaned of any dust particles deposited thereon, and in which said foil is composed of an aluminum alloy containing at least 99.45 percent aluminum; not more than 0.55 percent silicon, 0.55 percent iron, and 0.05 percent manganese; not less than 0.05 percent copper; and not more than 0.03 percent other elements.

39. A solar heating unit of claim 38, in which said foil is surrounded by a rigid frame and is unitary therewith, whereby the coefficient of expansion inherent in said alloy results in a distortion or crinkling of said foil which provides increased surface exposure when the rays of radiant energy impinge on said panel at an acute angle.

* * * * *